H. J. HAMER.
PIPE CUTTING MACHINE.
APPLICATION FILED AUG. 28, 1914.
1,166,456.
Patented Jan. 4, 1916.
2 SHEETS—SHEET 1.
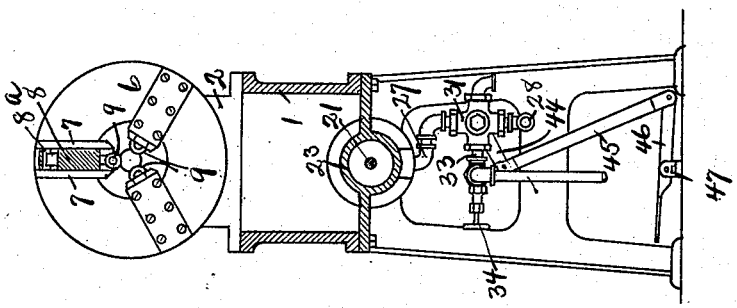
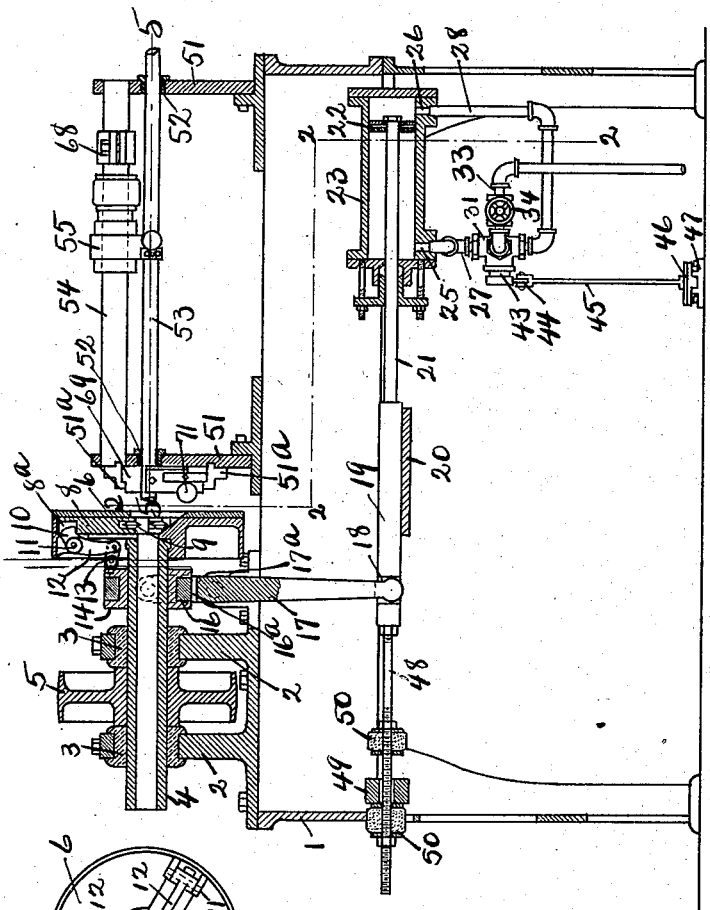
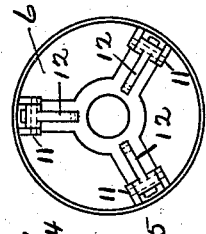
Witnesses
B. M. Hartman
M. H. Horneman
Inventor
Howard J. Hamer
By
Attorneys

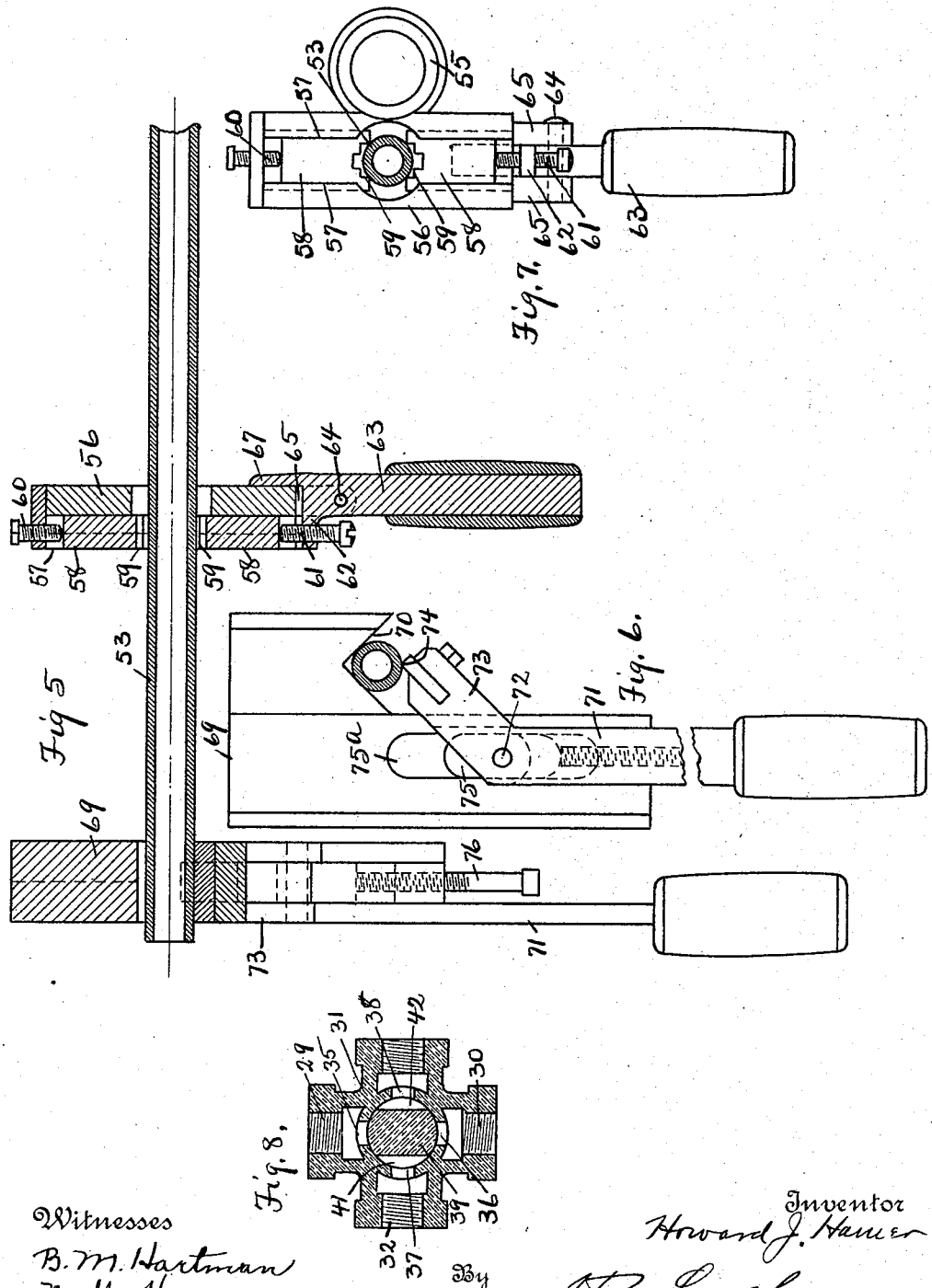

UNITED STATES PATENT OFFICE.

HOWARD J. HAMER, OF ERIE, PENNSYLVANIA, ASSIGNOR TO JARECKI MANUFACTURING COMPANY, OF ERIE, PENNSYLVANIA, A CORPORATION OF PENNSYLVANIA.

PIPE-CUTTING MACHINE.

1,166,456.   Specification of Letters Patent.   Patented Jan. 4, 1916.

Application filed August 28, 1914. Serial No. 859,051.

*To all whom it may concern:*

Be it known that I, HOWARD J. HAMER, a citizen of the United States, residing at Erie, in the county of Erie and State of Pennsylvania, have invented new and useful Improvements in Pipe-Cutting Machines, of which the following is a specification.

This invention relates to pipe cutting machines and consists in certain improvements in the construction thereof as will be hereinafter fully described and pointed out in the claims.

The object of the invention is to cut off predetermined lengths of pipe as for nipples. With a machine of this type, it is desirable to have this operation accomplished with great rapidity and this machine accomplishes this purpose.

The invention is illustrated in the accompanying drawings as follows:—

Figure 1 is a longitudinal section extending vertically through the machine. Fig. 2 is a section on the line 2—2 in Fig. 1. Fig. 3 is a rear view of the cutter head. Fig. 4 is a side view of the actuating collar. Fig. 5 is a horizontal section of the pipe feeding and holding mechanisms on the line 5—5 in Fig. 1. Fig. 6 is a side view of the pipe gripping mechanism. Fig. 7 is a side elevation of the pipe feeding mechanism. Fig. 8 is a central section through the four-way valve controlling the fluid motor actuating the cutter head.

1 marks the frame of the machine, 2—2 upright posts extending from the top of the machine in which are the spindle bearings 3—3. A pulley spindle 4 is journaled in the bearings 3—3. A drive pulley 5 is mounted on the spindle 4 and drives the spindle. The cutter head 6 is fixed on the spindle. It has a series of radial guides 7 in which the cutter carriers 8 are slidably mounted. Roller cutters 9 are journaled in the inner ends of the carriers 8. The carriers have the notches 8ª in their outer ends and the arms 10 extend into these notches. The arms 10 are pivoted on the pins 11, the pins being carried by the head 6. An arm 12 extends inwardly from the arm 10, the two arms forming a bell crank lever. Links 13 extend from the inner ends of the arms 12 to the actuating collar 14, the ears 15 being provided on the collar 14 to which the links 13 are attached. It will be readily observed that as the actuating collar 14 is reciprocated on the spindle 4, the bell crank levers formed by the arms 10 and 11 are swung, moving the carriers 8 inwardly and outwardly so as to force the roller cutters 9 into the work and to return them to their outer position. In this way, the cutters are forced inwardly sufficiently to cut off lengths of pipe and then returned, the cut off portions of the pipe being discharged through the opening in the spindle 4.

The actuating collar 14 has an annular groove 16 in which is arranged a ring 16ª. The forked lever 17 is pivotally secured to each side of the ring 16ª. The lever is fulcrumed on a post 17ª and the lower end of the lever extends into a slot 18 in a slide 19. The slide 19 is carried on a guide 20 extending from the frame 1. The slide is secured to the piston rod 21. The piston rod is actuated by the piston 22. The piston 22 is arranged in the cylinder 23, the cylinder being carried by the frame. It will be readily seen that as the piston is reciprocated, the slide 19 is reciprocated and the lever 17 is thus rocked so as to reciprocate the actuating collar 14 so as to drive the cutters into and out of the work. The cylinder has the ports 25 and 26 connected by the pipes 27 and 28 respectively with the passages 29 and 30 respectively of the four-way controlling valve 31.

The controlling valve has a passage 32 connected with the supply pipe 33, this supply pipe having the ordinary hand valve control 34. The four-way valve is provided with the ways 35 and 36 leading to the passages 29 and 30 respectively. It also has the way 37 leading to the passage 32 and the way 38 leading to the exhaust. A plug 39 has the ways 41 and 42. As shown in Fig. 8, the valve is closed. It will be readily seen that if the valve is swung one-eighth revolution either passage 29 or 30 may be connected with the supply or exhaust. The plug 39 has an extension 43 to which a crank 44 is connected. The crank is connected by a link 45 with the pedal 46. The pedal is pivotally mounted at 47. The four-way valve is so arranged that with a downward movement of the pedal, air is turned into the passage 29 and thus forces the piston 22 to the right as shown in Fig. 1. This carries the actuating collar 14 to the left and forces the cutters into the work. When the pedal is released, the valve is reversed. The plug is swung so as to connect the passage 29 with the exhaust and the passage 30 with the supply. The piston is then moved in the opposite direction so as to release the work.

A stop rod 48 is secured to the slide 19. It extends through a stop projection 49 on the frame. It has the adjustable blocks 50. By arranging these blocks 50, the travel of the carriers may be limited and varied for different sizes of pipe.

The pipe feeding and holding mechanism is as follows:—Uprights 51 are mounted on the frame 1. These have the guide openings 52 through which the pipe 53 extends. A guide rod 54 is mounted on the upper ends of the uprights 51. A slide 55 is mounted on the guide rod 54. It has the feeding frame 56 arranged beneath. The feeding frame 56 has the guides 57—57 extending transversely across it in which the slides 58—58 are mounted. The slides 58—58 have the toothed ends 59 for gripping the pipe. The rear slide 58 is locked in position and adjusted for different pipes by a screw 60. The front slide 58 is engaged by a screw 61. The screw 61 is carried by an arm 62 extending from the hand lever 63. The hand lever 63 is mounted on a pin 64 between the fingers 65 extending from the frame 56. A stop finger 67 extends from the lever 63 and engages the frame 56.

It will be readily observed that when the lever 63 is pushed toward the left, or forward, the screw 61 is forced inwardly and carries with it the forward slide 58 against the pipe 53, thus engaging the pipe so that it can be fed forward. As the pressure on the lever 63 is reversed, the pressure on the screw 61 is relieved so that the pipe is released. A stop 67 limits the rearward movement of the lever 63, however, so that when pressure is exerted in this direction, the gripping mechanism can be moved toward the rear. The slide 55 moves forward on the guide rod 54 as the pipe is moved forward with pressure on the lever 63 toward the left and slides toward the rear when pressure on the lever 63 is reversed. From this it will be seen that all that is required of the operator is to force the feeding frame to the right against the stop 68 while the pipe is gripped and being cut and upon the completion of the cut and the release of the gripping mechanism a simple movement of the handle of the lever 63 toward the left feeds forward the pipe to the pre-determined distance desired.

The pipe is gripped during the cutting action so as to hold it against a rotation and against movement by the following mechanism: Guides 51ª are mounted on the upright 51 nearest the cutting head. These extend from front to the back of the machine and the frame 69 is mounted in the guides 51ª. This is provided with a pipe receiving notch 70, this notch having contact surfaces arranged preferably at forty-five degrees in the usual manner. A grip lever 71 is mounted on a pin 72. An arm 73 extends upwardly from the pivot. The lever 71 and arm 73 making a bell crank lever. A grip point 74 is arranged on the end of the arm 73 in position to engage the pipe and force it into the notch 70, the edge or point 74 gripping the pipe so as to prevent its turning. The pivot pin 72 is mounted in a block 75 which is slidingly mounted in a slot 75ª in the frame 69. A screw 76 is provided for adjusting the block 75 in the slot 75ª so as to properly position the arm 73 for different sizes of pipe. The sliding frame 69 permits the frame as a whole to accommodate itself to the pipe.

In the general operation of the machine, the grip lever 71 is depressed so as to disengage the pipe 53. The lever 63 is forced toward the left shoving the pipe forward to the limit of the movement of the slide 55. The gripping lever 71 is raised again engaging the pipe. The pedal 46 is depressed turning the air on the left hand side of the cylinder 23 and thus forcing the roller cutters 9 through the pipe. The pedal is released, gravity reverses the air on the piston, thus moving the cutters out of position. The grip lever is depressed, disengaging the pipe and the feeding lever is again moved forward feeding forward a new length of pipe to be cut off. The feeding lever which has been returned to the right during the time that the pipe is gripped and the cutting action is taking place, is again fed forward, or moved toward the left moving in a new length of pipe. This sequence of movements with this machine using the roller cutters and the air feed which gives a uniform pressure with the system of gripping and feeding utilizing the two hands, the cutting action being controlled by the foot, is very rapid.

What I claim as new is:—

1. In a pipe cutting machine, the combination of a rotating head; movable cutters mounted on said head; mechanism for actuating said cutters, said mechanism exerting a uniform pressure on said cutters; and a manually controlled device for feeding the pipe forward.

2. In a pipe cutting machine, the combination of a rotating cutting head; movable cutters mounted on the head; foot controlled mechanism for actuating said cutters, said mechanism exerting a uniform pressure on said cutters; and a hand controlled device for feeding pipe forward.

3. In a pipe cutting machine, the combination of a rotating cutting head; movable cutters mounted on the head; foot controlled mechanism for actuating said cutters; a hand controlled device for feeding pipe forward; and a hand controlled device for locking the pipe against turning during the cutting action.

4. In a pipe cutting machine, the combination of a rotating cutting head; a device for actuating the cutting head and adapted to exert uniform pressure on said head; a pedal controlling said actuating device; a gripping device for locking pipe against turning; a hand lever for controlling said gripping device; a feeding device for feeding pipe forward; and a hand lever for actuating the feeding device.

5. In a pipe cutting machine, the combination of a rotating cutting head; a fluid actuated device for actuating the cutting head; a pedal controlling the fluid actuated device; a gripping device for locking the pipe against turning; a hand lever for controlling said gripping device; a feeding device for feeding the pipe forward; and a hand lever for actuating the feeding device.

6. In a pipe cutting machine, the combination of a rotating cutting head; a fluid actuated device for actuating the cutting head; a pedal controlling the fluid actuated device; a gripping device for locking the pipe against turning; a hand lever for controlling said gripping device; a feeding device for feeding the pipe forward; and a hand lever for actuating the feeding device, said hand lever being adapted to automatically engage the pipe when moved forward and to automatically release the pipe on a return movement.

In testimony whereof I have hereunto set my hand in the presence of two subscribing witnesses.

HOWARD J. HAMER.

Witnesses:
BLANCHE M. HARTMAN,
THOMAS C. MILLER.

Copies of this patent may be obtained for five cents each, by addressing the "Commissioner of Patents, Washington, D. C."